(12) United States Patent
Taylor et al.

(10) Patent No.: US 8,845,359 B2
(45) Date of Patent: Sep. 30, 2014

(54) CONNECTOR WITH CABLE RETENTION FEATURE AND PATCH CORD HAVING THE SAME

(75) Inventors: Chris Taylor, Cheltenham Glos (GB); Gordon John White, Gloucester (GB)

(73) Assignee: Tyco Electronics UK Ltd (GB)

( * ) Notice: Subject to any disclaimer, the term of this patent is extended or adjusted under 35 U.S.C. 154(b) by 169 days.

(21) Appl. No.: 13/524,938

(22) Filed: Jun. 15, 2012

(65) Prior Publication Data

US 2012/0329320 A1    Dec. 27, 2012

Related U.S. Application Data

(60) Provisional application No. 61/499,467, filed on Jun. 21, 2011.

(51) Int. Cl.
*H01R 13/58*  (2006.01)
*H01R 13/50*  (2006.01)
*H01R 24/64*  (2011.01)

(52) U.S. Cl.
CPC .............. *H01R 13/501* (2013.01); *H01R 24/64* (2013.01); *H01R 13/582* (2013.01)
USPC ......................................... 439/447; 439/467

(58) Field of Classification Search
CPC ...................................................... H01R 13/562
USPC .................................. 439/447, 460, 465, 467
See application file for complete search history.

(56) References Cited

U.S. PATENT DOCUMENTS

| | | | |
|---|---|---|---|
| 835,003 A | 11/1906 | Svensson | |
| 2,434,475 A | 1/1948 | Sullivan | |
| 2,552,414 A | 5/1951 | Eriksen et al. | |
| 3,001,169 A | 9/1961 | Blonder | |
| 3,601,766 A | 8/1971 | Alibert | |
| 3,710,005 A | 1/1973 | French | |
| 4,408,822 A | 10/1983 | Nikitas | |
| 4,421,376 A * | 12/1983 | Cosmos et al. | 439/461 |
| 4,737,122 A | 4/1988 | Dechelette | |
| 5,186,649 A | 2/1993 | Fortner et al. | |
| 5,195,906 A | 3/1993 | Szegda | |
| 5,389,012 A | 2/1995 | Huang | |
| 5,391,092 A * | 2/1995 | Sumida | 439/470 |
| 5,393,244 A | 2/1995 | Szegda | |
| 5,531,618 A | 7/1996 | Market | |
| 5,685,736 A * | 11/1997 | Lung | 439/447 |
| 5,877,452 A | 3/1999 | McConnell | |
| 5,908,327 A * | 6/1999 | Tsuji et al. | 439/470 |
| 6,017,237 A | 1/2000 | Sullivan | |
| 6,019,635 A | 2/2000 | Nelson | |
| 6,293,824 B1 | 9/2001 | Guerin et al. | |

(Continued)

OTHER PUBLICATIONS

International Search Report and Written Opinion for Application No. PCT/US2012/042463 mailed Jan. 2, 2013.

(Continued)

*Primary Examiner* — Neil Abrams
(74) *Attorney, Agent, or Firm* — Merchant & Gould P.C.

(57) ABSTRACT

A patch cord including a connector attached to an end of an electrical cable. The connector includes a single-piece attachment member having a management section, a boot, and collar including a retention arrangement. Certain types of retention arrangements include one or more teeth that protrude inwardly from the collar to bite into at least an outer jacket of the electrical cable.

14 Claims, 15 Drawing Sheets

(56) References Cited

U.S. PATENT DOCUMENTS

| | | | |
|---|---|---|---|
| 6,323,427 B1 | 11/2001 | Rutledge | |
| 6,358,091 B1 * | 3/2002 | Lo et al. | 439/607.06 |
| 6,371,794 B1 | 4/2002 | Bauer et al. | |
| 6,439,911 B1 | 8/2002 | Conorich | |
| 6,495,755 B2 | 12/2002 | Burton et al. | |
| 6,641,443 B1 | 11/2003 | Itano et al. | |
| 6,786,776 B2 | 9/2004 | Itano et al. | |
| 6,837,738 B1 * | 1/2005 | Chen | 439/418 |
| 6,840,803 B2 | 1/2005 | Wlos et al. | |
| 6,878,009 B2 | 4/2005 | Amemiya | |
| 6,953,362 B2 | 10/2005 | Mossner et al. | |
| 6,981,887 B1 | 1/2006 | Mese et al. | |
| 7,025,621 B2 | 4/2006 | Moessner et al. | |
| 7,115,815 B2 | 10/2006 | Kenny et al. | |
| 7,144,272 B1 | 12/2006 | Burris et al. | |
| 7,173,189 B1 | 2/2007 | Hazy et al. | |
| 7,214,884 B2 | 5/2007 | Kenny et al. | |
| 7,229,309 B2 * | 6/2007 | Carroll et al. | 439/418 |
| 7,270,563 B2 | 9/2007 | Mossner et al. | |
| 7,271,342 B2 | 9/2007 | Stutzman et al. | |
| 7,375,284 B2 | 5/2008 | Stutzman et al. | |
| 7,411,131 B2 | 8/2008 | Stutzman | |
| 7,413,466 B2 | 8/2008 | Clark et al. | |
| 7,422,470 B2 * | 9/2008 | Tsuji | 439/470 |
| 7,549,891 B2 | 6/2009 | Mossner et al. | |
| 7,556,536 B2 * | 7/2009 | Caveney et al. | 439/676 |
| 7,651,361 B2 * | 1/2010 | Henry et al. | 439/352 |
| 7,712,214 B2 | 5/2010 | Clark et al. | |
| 8,083,551 B2 | 12/2011 | Hetzer et al. | |
| 8,137,126 B2 | 3/2012 | Clark et al. | |
| 8,435,083 B2 | 5/2013 | Hetzer et al. | |
| 8,574,000 B1 * | 11/2013 | Smith | 439/467 |
| 8,684,763 B2 | 4/2014 | Mattson et al. | |
| 2003/0199192 A1 | 10/2003 | Caveney et al. | |
| 2005/0087357 A1 | 4/2005 | Steinich | |
| 2005/0092515 A1 | 5/2005 | Kenny et al. | |
| 2005/0106929 A1 | 5/2005 | Meckley et al. | |
| 2005/0153603 A1 | 7/2005 | AbuGhazaleh et al. | |
| 2005/0202697 A1 | 9/2005 | Caveney et al. | |
| 2005/0287873 A1 | 12/2005 | Carroll et al. | |
| 2007/0144762 A1 | 6/2007 | Stutzman et al. | |
| 2007/0295526 A1 | 12/2007 | Stutzman et al. | |
| 2007/0295527 A1 | 12/2007 | Stutzman | |
| 2008/0220658 A1 | 9/2008 | Caveney et al. | |
| 2008/0318476 A1 | 12/2008 | Weber et al. | |
| 2009/0275228 A1 | 11/2009 | Henry et al. | |
| 2011/0115494 A1 | 5/2011 | Taylor et al. | |
| 2012/0329320 A1 * | 12/2012 | Taylor et al. | 439/588 |

OTHER PUBLICATIONS

Catalog from Plug Master Industrial Co., Ltd., E205572, pp. 1-31 (2004).

* cited by examiner

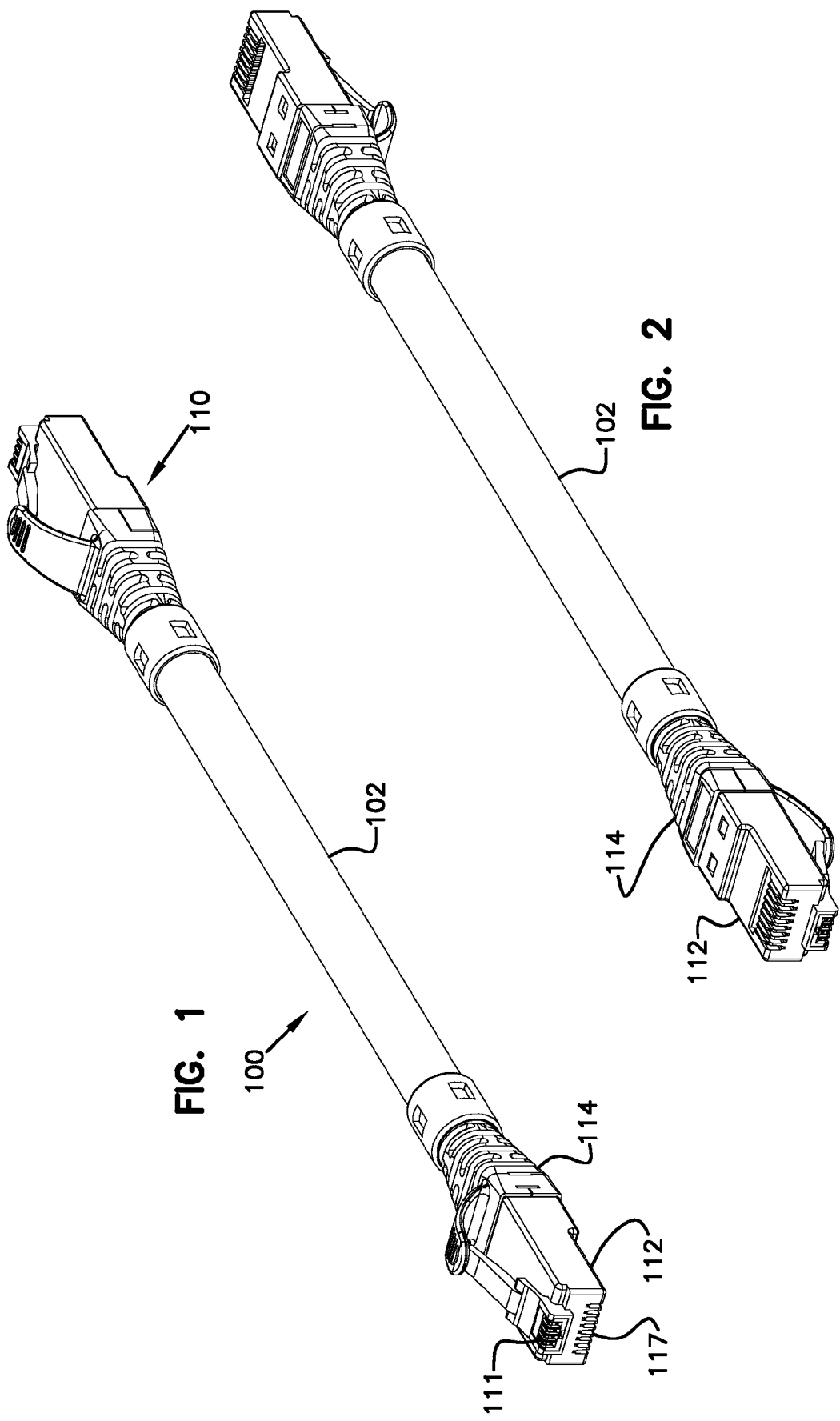

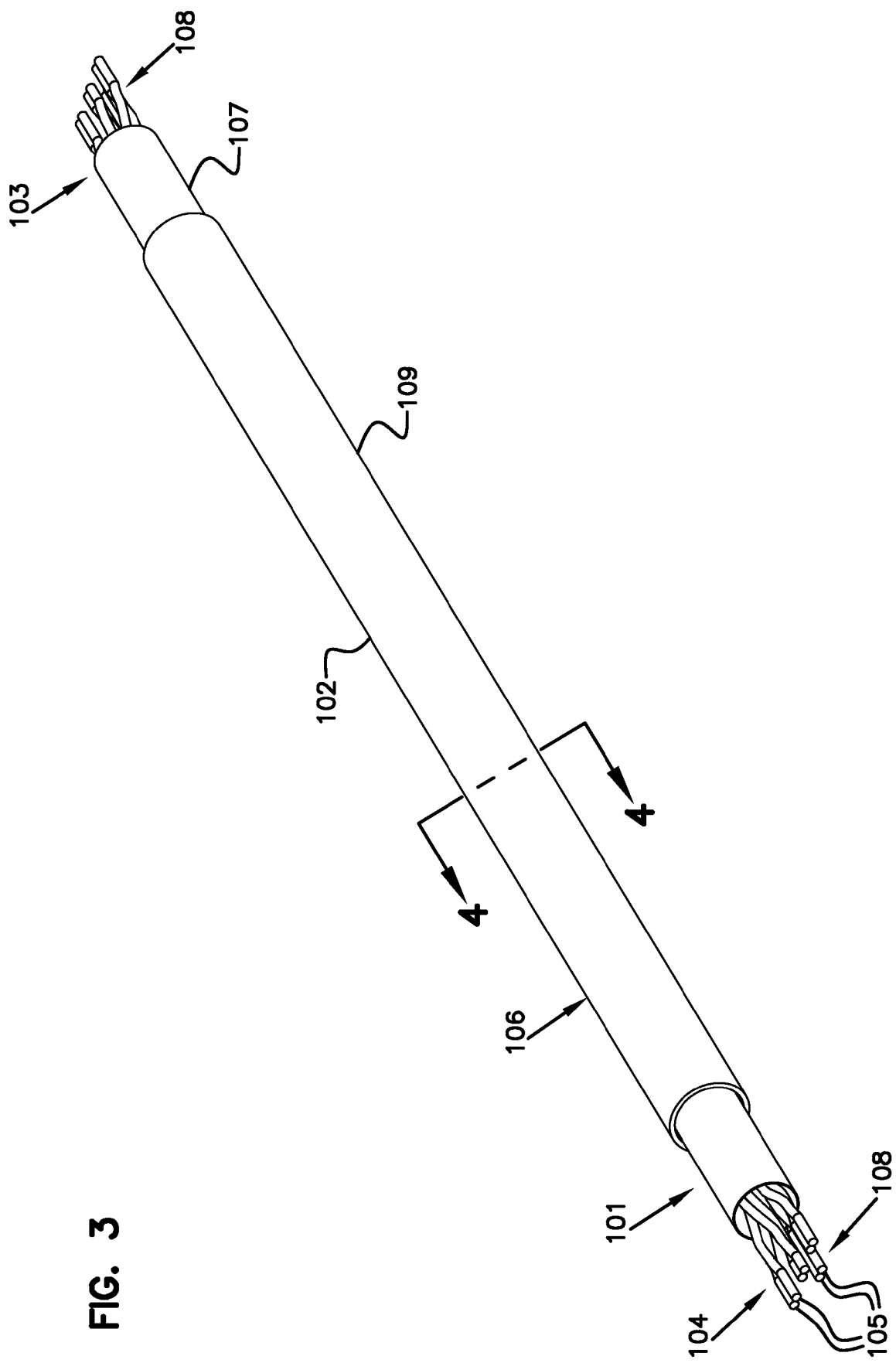

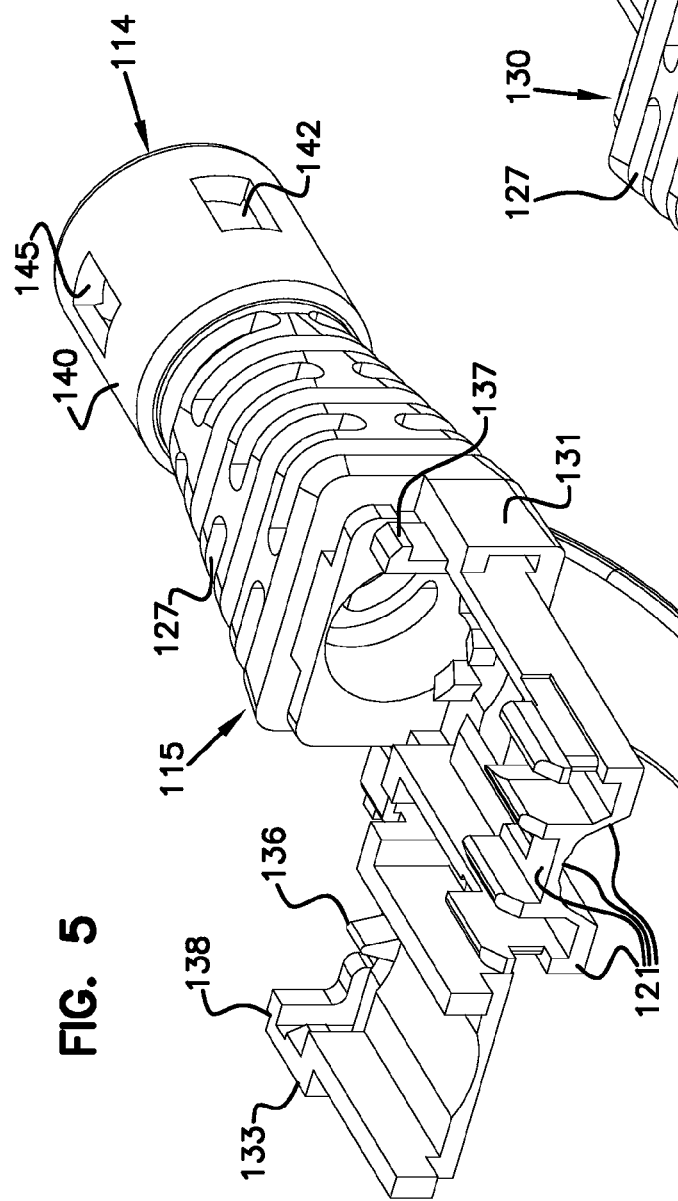
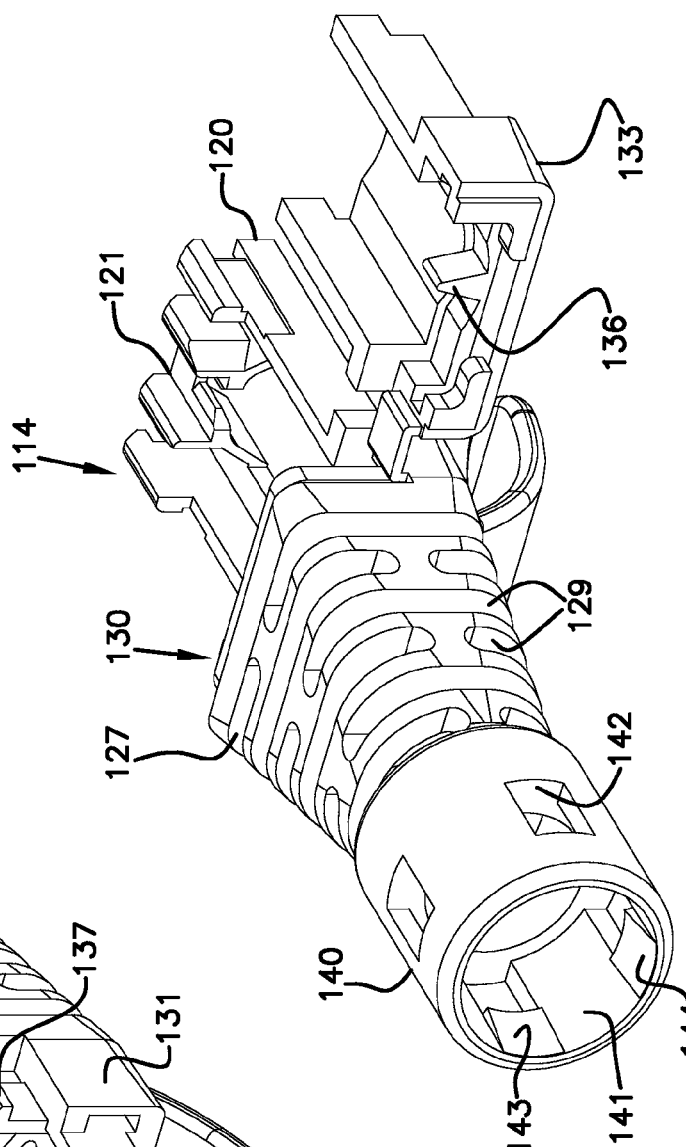
FIG. 5
FIG. 6

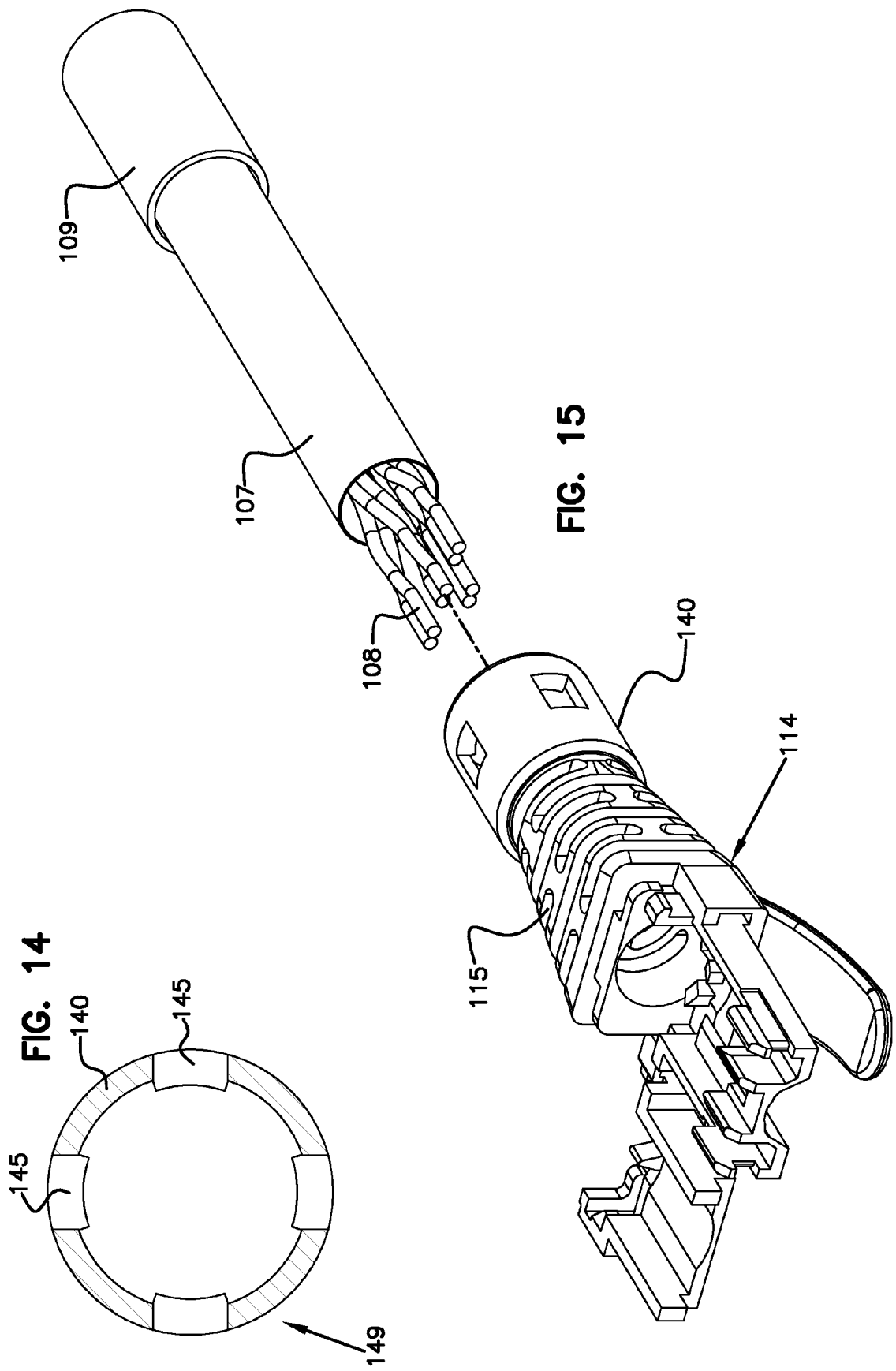

CONNECTOR WITH CABLE RETENTION FEATURE AND PATCH CORD HAVING THE SAME

CROSS-REFERENCE TO RELATED APPLICATIONS

This application claims the benefit of U.S. Provisional Application No. 61/499,467, filed Jun. 21, 2011, titled "Connector with Cable Retention Feature and Patch Cord Having the Same," the disclosure of which is hereby incorporated herein by reference.

TECHNICAL FIELD

The present disclosure relates generally to cables for use in the telecommunications industry, and various methods associated with such cables. More particularly, this disclosure relates to telecommunication patch cords.

BACKGROUND

The telecommunications industry utilizes cabling in a wide range of applications. Some cabling arrangements include twisted pairs of insulated conductors, the pairs being twisted about each other to define a twisted pair core. An insulating jacket is typically extruded over the twisted pair core to maintain the configuration of the core, and to function as a protective layer. Such cabling is commonly referred to as a multi-pair cable.

Multi-pair cables are used in many applications; for example, patch cords often utilize multi-pair cables. Patch cords include connectors secured to each end of a multi-pair cable and are used to provide electrical interconnections between two pieces of equipment. The connectors are typically clamped onto the ends of the multi-pair cable.

Conventional patch cord connectors, such as RJ45 type connectors, often cannot meet the stringent electrical requirements associated with high speed signal transmission applications. Such electrical requirements can concern, for example, alien crosstalk arising from high speed signal transmissions. In most cases, the inability to meet the electrical requirements is due at least in part to inadequate retention of the connector in relation to the cable and/or cable jacket. Inadequate retention of the connector causes distortion in both the twisted pair core as well as the individual pairs of the multi-pair cable, which in turn adversely affects electrical performance.

To address the above retention problem, some more recent connector arrangements include additional securing components. The additional securing components, however, increase the manufacturing cost of both the connector and the cable in terms of added materials, machining or molding, and assembly.

In general, improvement has been sought with respect to such connector and cable arrangements, generally to improve attachment of a connector to a multi-pair cable, and related assembly processes.

SUMMARY

One aspect of the present disclosure relates to a patch cord. The patch cord includes a connector attached to an end of a multi-pair cable. The connector includes a retention arrangement that engages a jacket of the multi-pair cable. Still another aspect of the present disclosure relates to a method of assembling a patch cord having a connector with a retention arrangement. A further aspect of the present disclosure relates to a multi-pair cable connector having a retention arrangement for retaining the connector on a multi-pair cable.

A variety of examples of desirable product features or methods are set forth in part in the description that follows, and in part will be apparent from the description, or may be learned by practicing various aspects of the disclosure. The aspects of the disclosure may relate to individual features as well as combinations of features. It is to be understood that both the foregoing general description and the following detailed description are explanatory only, and are not restrictive of the claimed invention.

BRIEF DESCRIPTION OF THE DRAWINGS

FIG. 1 is a top perspective view of one example implementation of a patch cord, including a multi-pair cable and connectors, in accordance with the principles of the present disclosure;

FIG. 2 is a bottom perspective view of the patch cord of FIG. 1;

FIG. 3 is a perspective view of the multi-pair cable of the patch cord of FIG. 1, shown in isolation;

FIG. 5 is a front, bottom perspective view of an attachment member of one of the connectors of FIG. 1, shown in isolation;

FIG. 6 is a rear, bottom perspective view of the attachment member of FIG. 5;

FIG. 14 is a cross-sectional view taken along the 14-14 line of FIG. 9;

FIG. 15 is an exploded, perspective view of a portion of the patch cord of FIG. 1, with the plug nose removed from the attachment member of one of the connectors and a moveable cover of the attachment member in the open position;

DETAILED DESCRIPTION

Figure 4:
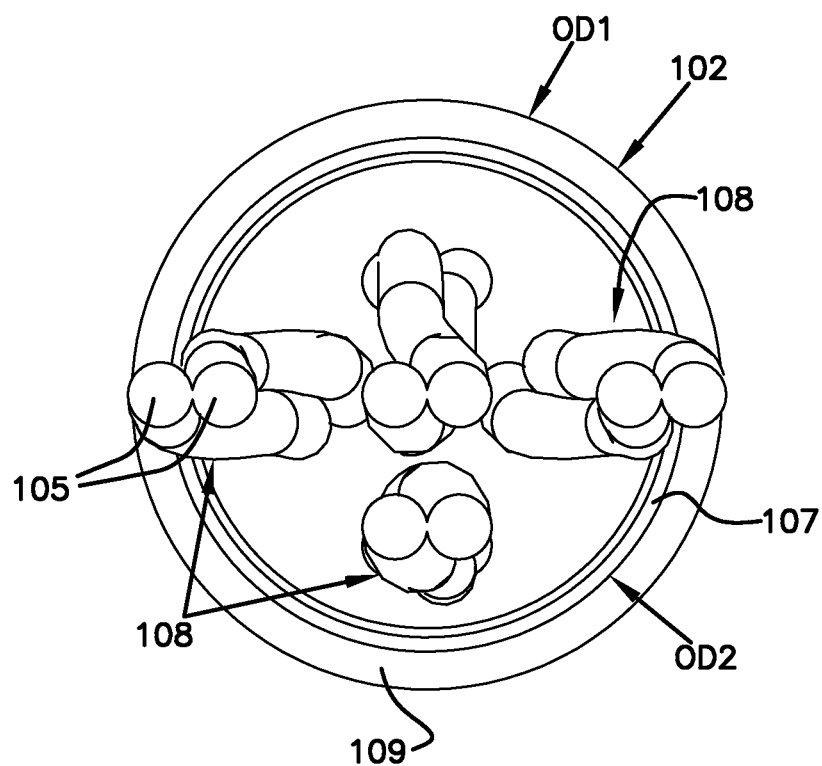
FIG. 4 is a schematic, cross-sectional view of the multi-pair cable of FIG. 3, taken along line 4-4.
Figure 7:
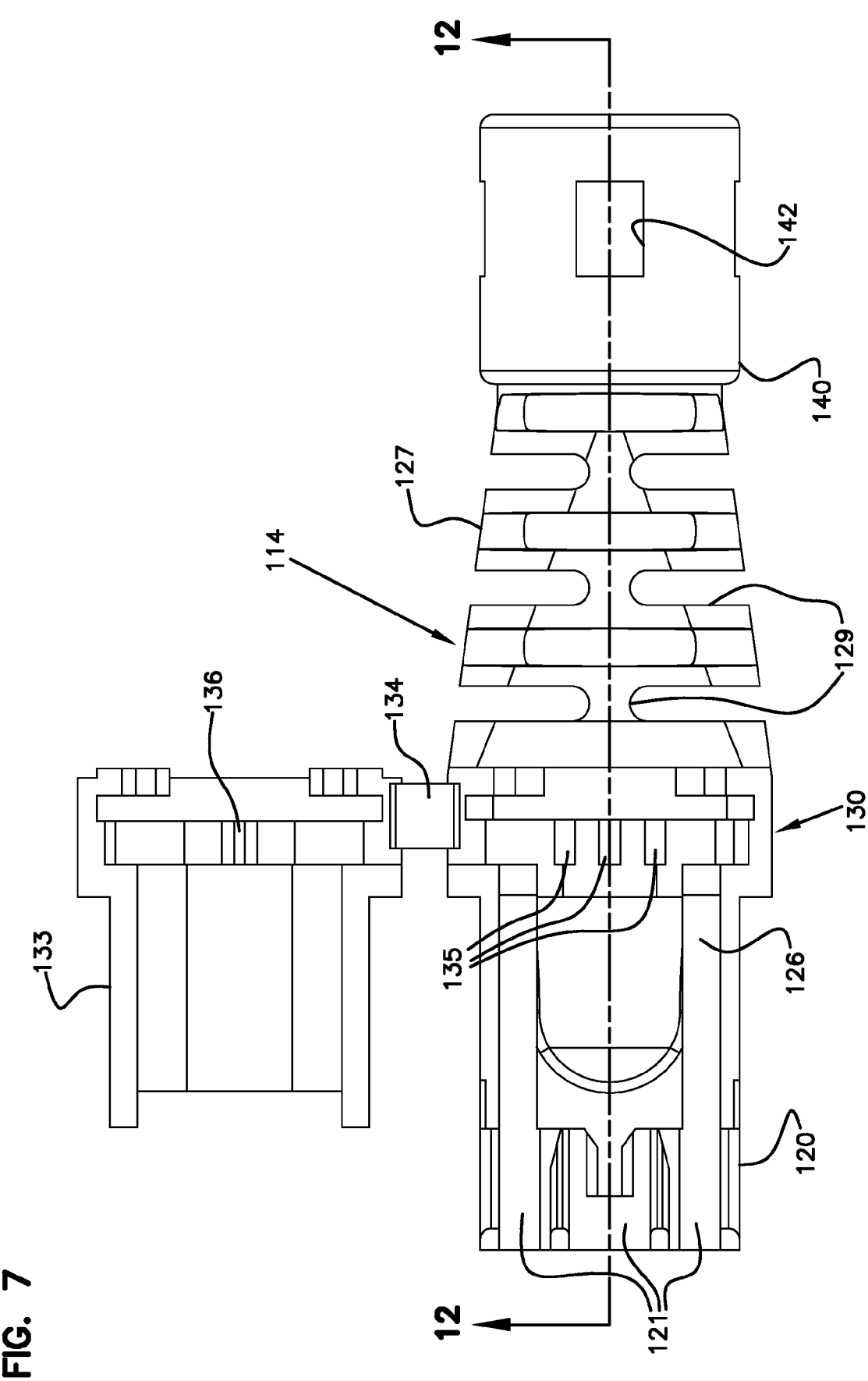
FIG. 7 is a bottom plan view of the attachment member of FIG. 5.
Figure 8:
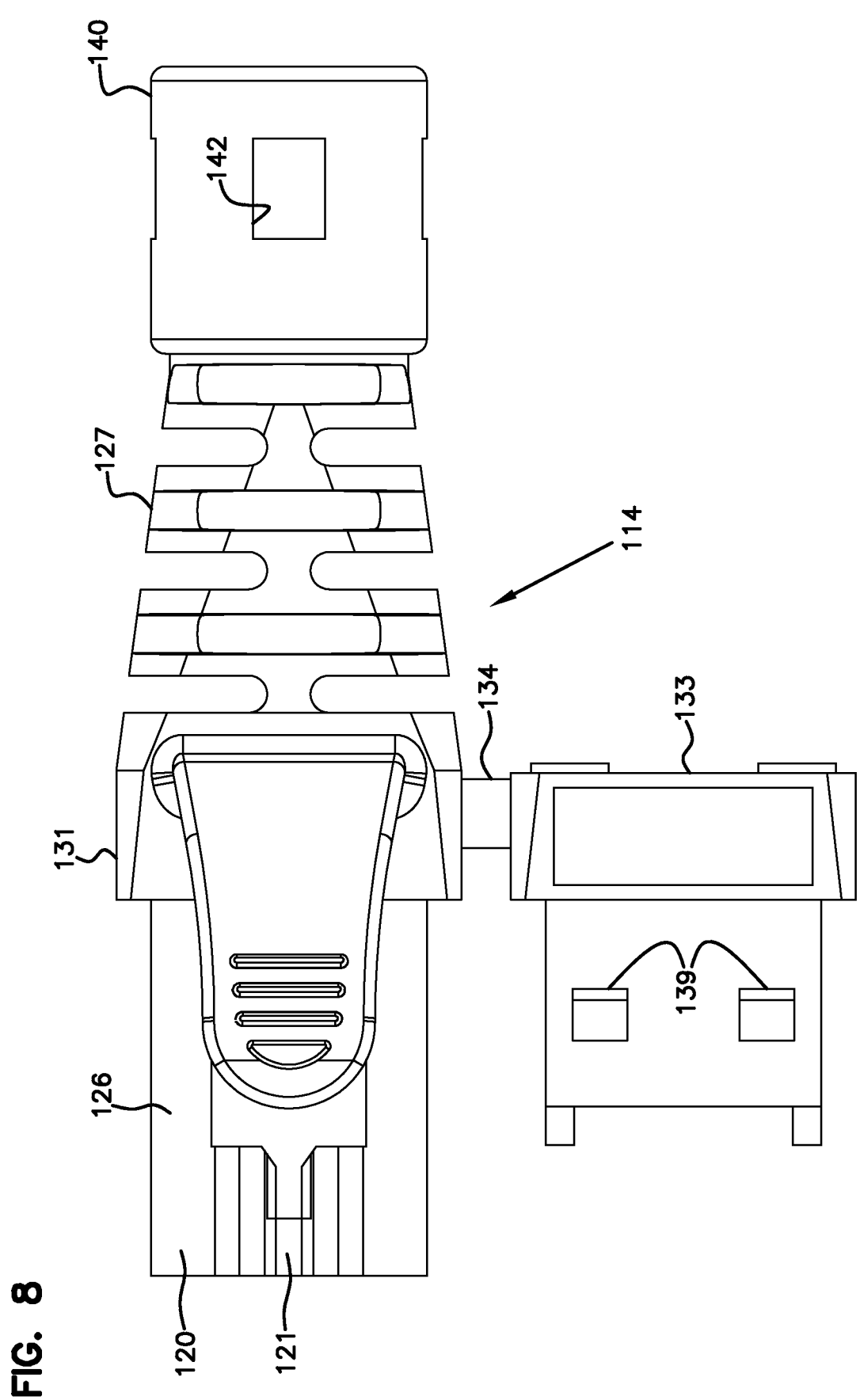
FIG. 8 is a top plan view of the attachment member of FIG. 5.
Figure 9:
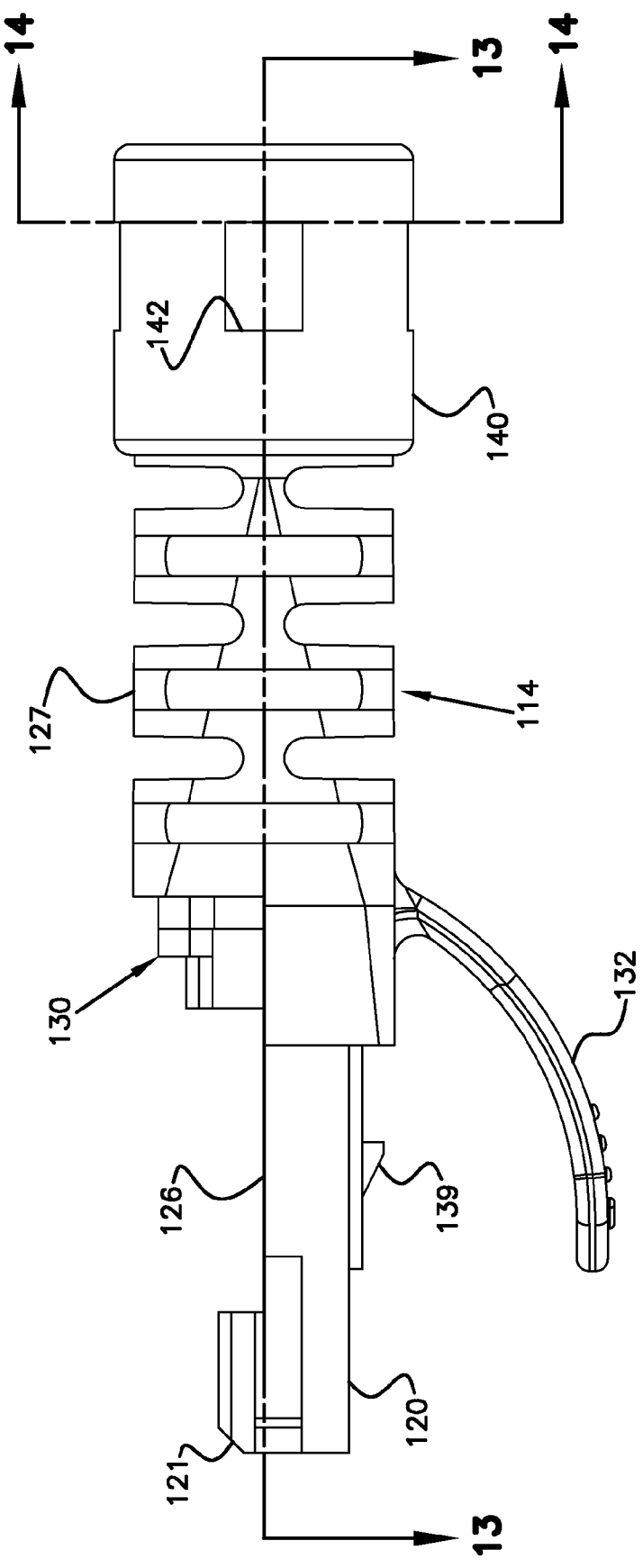
FIG. 9 is a side elevational view of the attachment member of FIG. 5.
Figure 10:
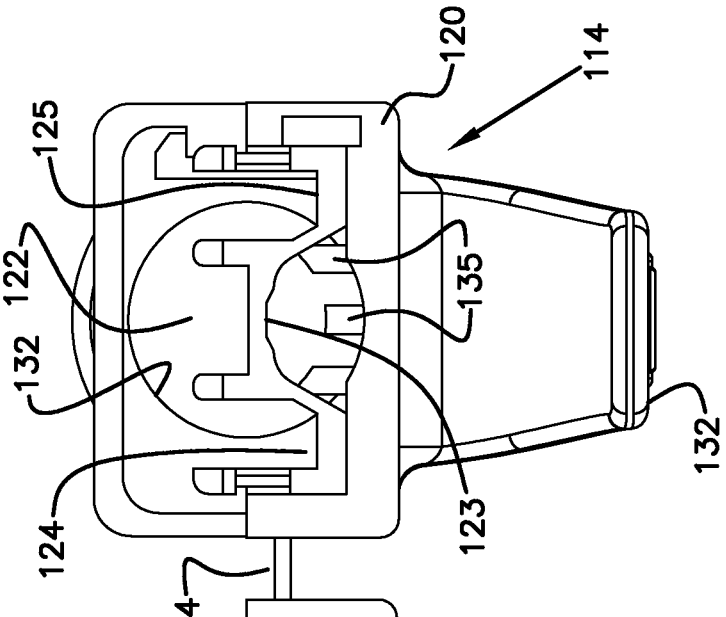
FIG. 10 is a front elevational view of the attachment member of FIG. 5.
Figure 11:
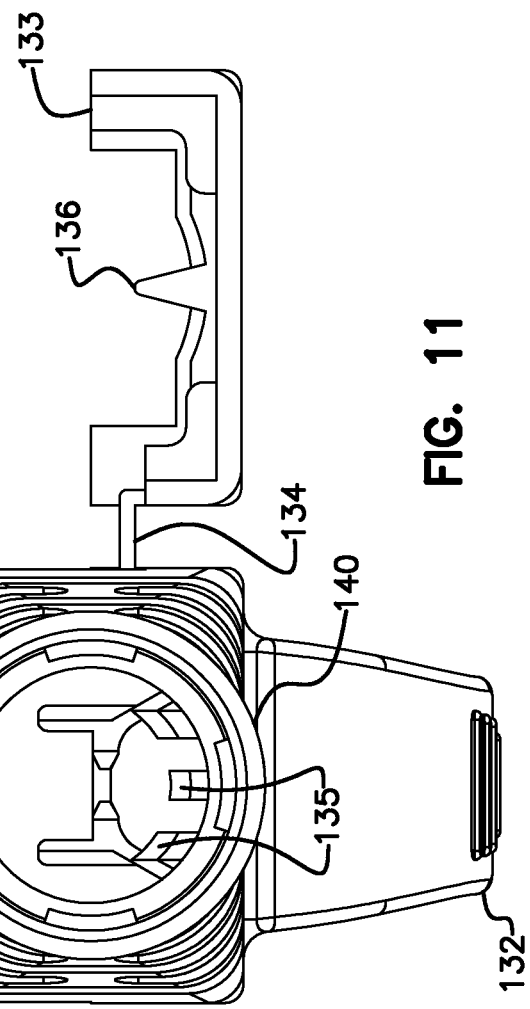
FIG. 11 is a rear elevational view of the attachment member of FIG. 5.
Figure 12:
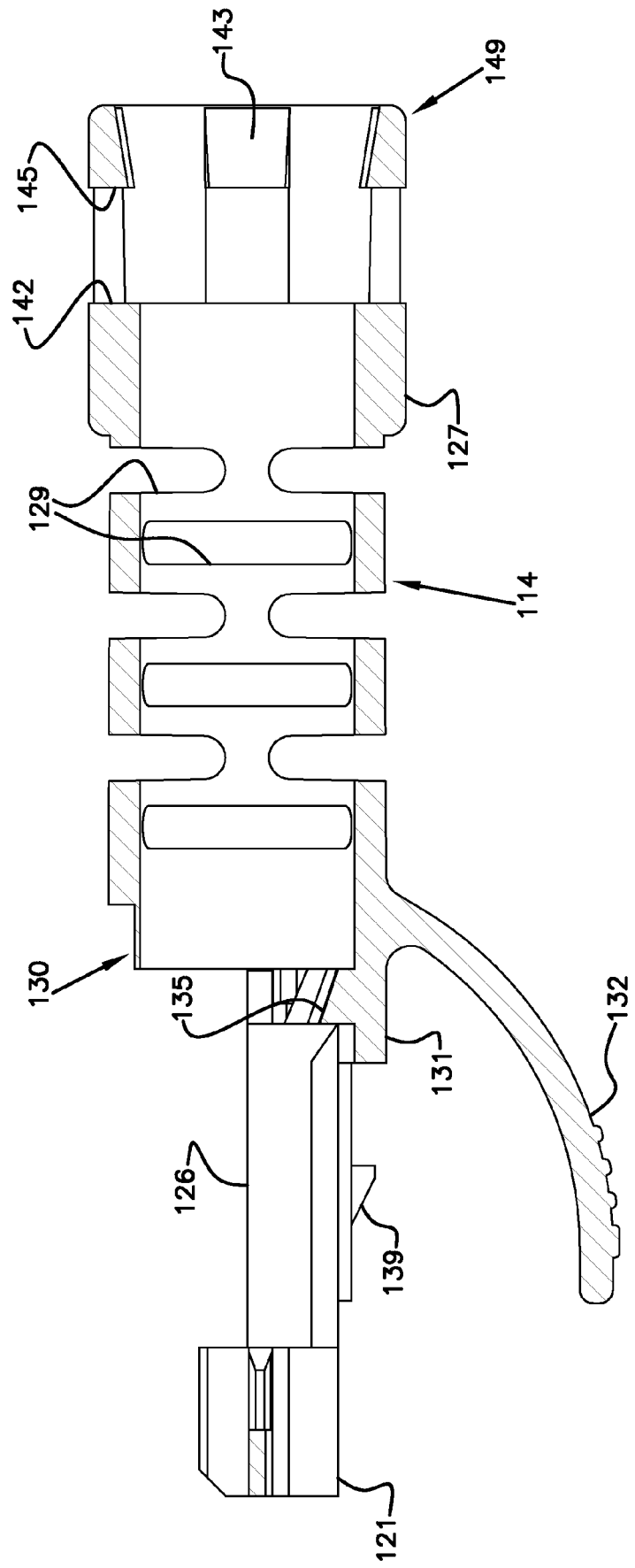
FIG. 12 is a cross-sectional view taken along the 12-12 line of FIG. 7.
Figure 13:
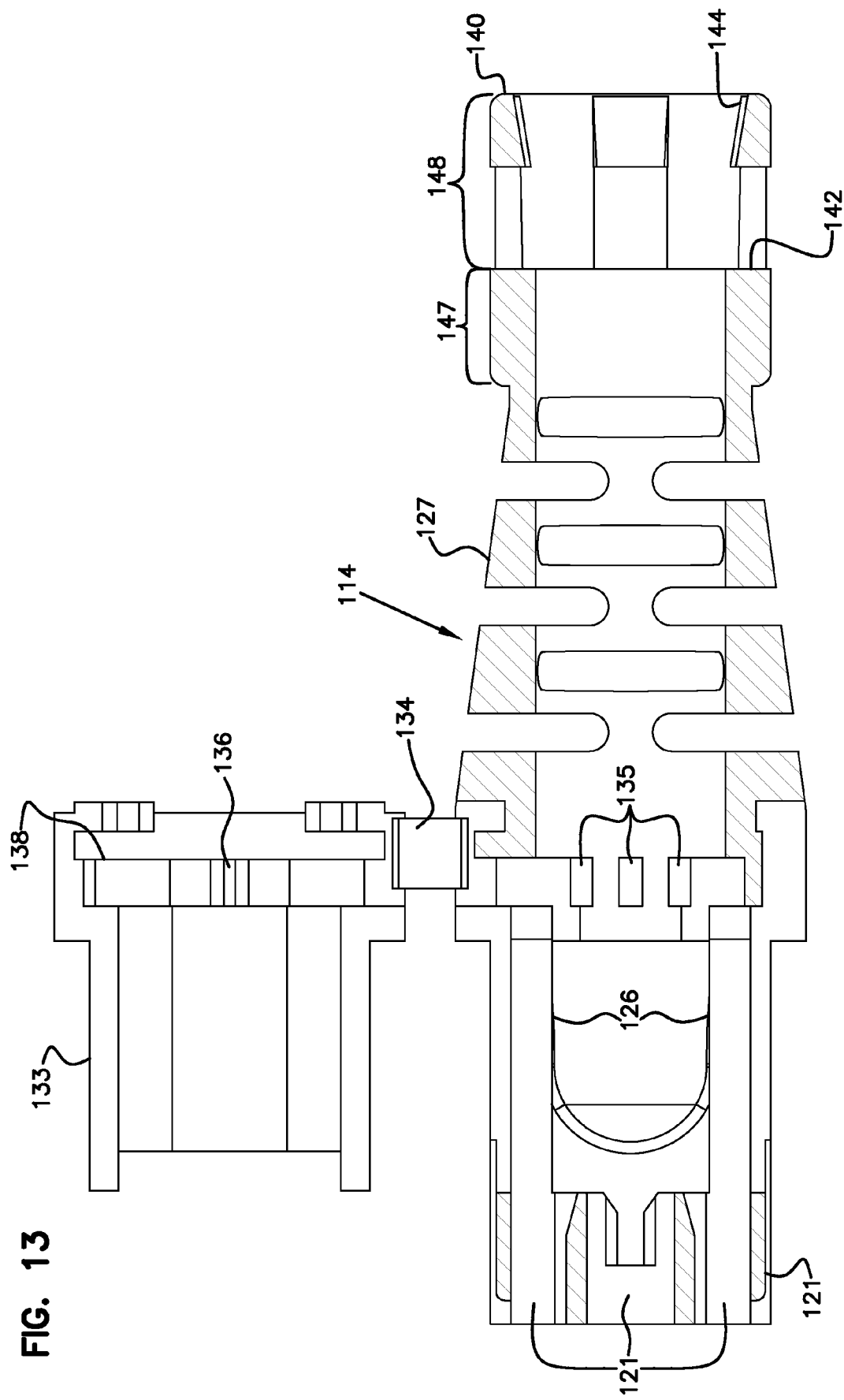
FIG. 13 is a cross-sectional view taken along the 13-13 line of FIG. 9.
Figure 16:
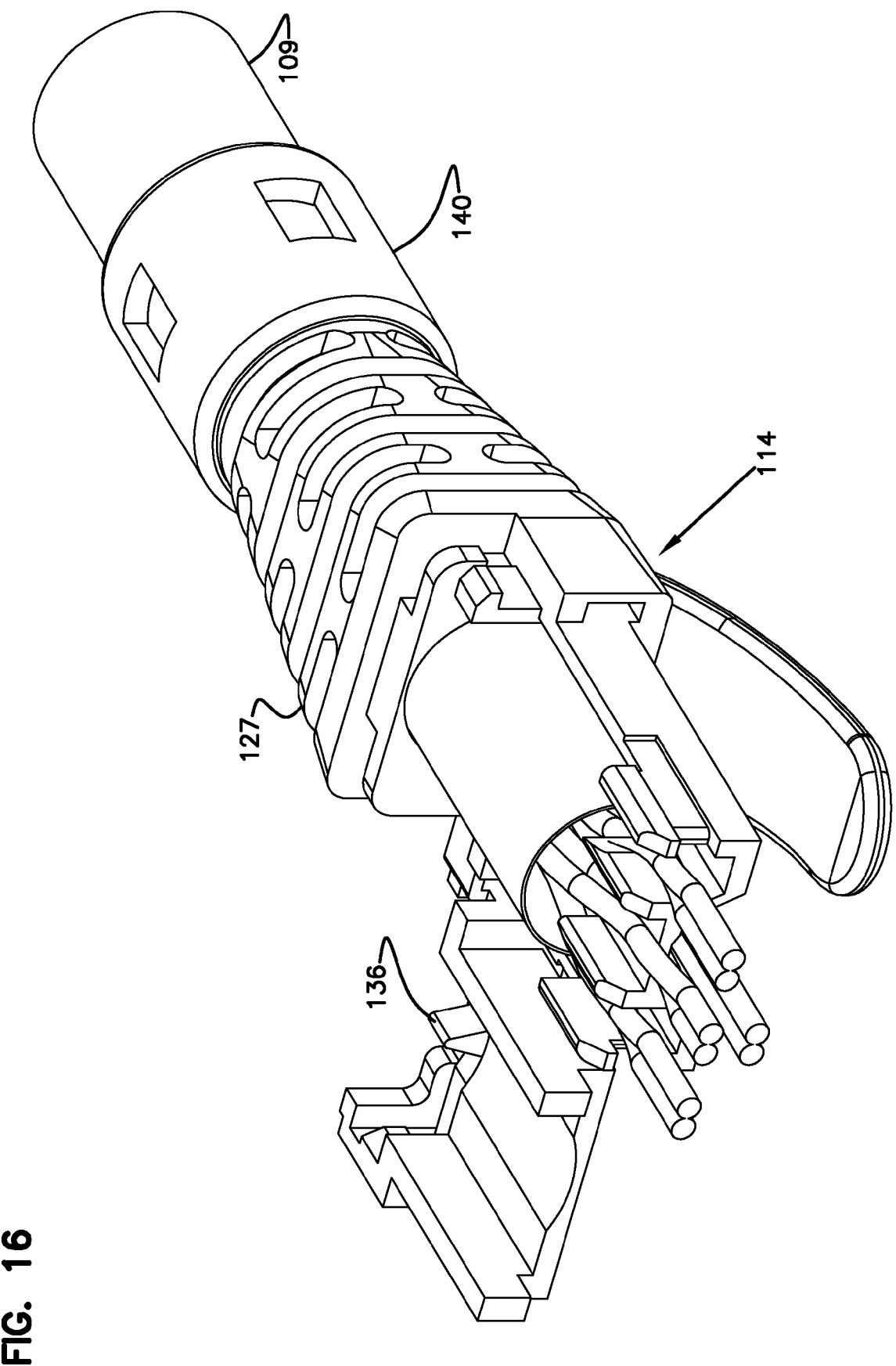
FIG. 16 is a perspective view of a partially assembled connector with the multi-pair cable of FIG. 3 slid through the attachment member of FIGS. 5-14.

Reference will now be made in detail to various features of the present disclosure that are illustrated in the accompanying drawings. Wherever possible, the same reference numbers will be used throughout the drawings to refer to the same or like parts.

A. Introduction

In general, the present disclosure relates to a connector having a slide-on retention arrangement that retains the connector in relation to an end of a cable. The retention arrangement makes the connector easy to assemble onto a multi-jacket cable, requires no additional parts, and does not adversely affect the electrical performance of the cable's core or twisted pairs.

As will be described in greater detail hereinafter, the retention arrangement of the presently disclosed connector includes one or more teeth that slide over a double-layered jacket of a cable in one direction during installation and bite into the jacket when pulled in an opposite direction. In some implementations, the retention arrangement is designed to inhibit longitudinal movement of an outer jacket of the cable without disturbing the cable core or the individual twisted pairs. In certain implementations, the connector also is designed also to inhibit longitudinal movement of an inner jacket of the cable. In addition to providing improved connector retention, the retention arrangement also has the effect of providing a secure strain relief feature for the cable exiting the connector.

Referring to FIGS. 1 and 2, one example implementation of a patch cord 100 having features that are examples of how inventive aspects of the present disclosure may be practiced, is illustrated. The patch cord 100 generally includes a cable 102 having a first end 101 and a second end 103. First and second connectors 110 are attached to the ends 101, 103 of the cable 102.

B. Multi-Pair Cable, Generally

Referring to FIGS. 3 and 4, the cable 102 of the presently disclosed patch cord 100 includes a plurality of twisted pairs 108. In the illustrated example, the cable 102 includes four twisted pairs 108. Each of the four twisted pairs includes first and second insulated conductors 105 twisted about one another along a longitudinal pair axis. The electrical conductors (e.g., wires) of the insulated conductors 105 may be made of copper, aluminum, copper-clad steel, plated copper, or other electrically conductive materials. In one example implementation, the conductors 105 are made of braided copper. One example of a braided copper conductor construction that can be used is described in more detail in U.S. Pat. No. 6,323,427, which is incorporated herein by reference. In other implementations, the conductors 105 may be made of glass or plastic fiber such that a fiber optic cable is produced in accordance with the principles disclosed. The insulating layer of the insulated conductors 105 can be made of electrical insulating materials (e.g., fluoropolymers).

The plurality of twisted pairs 108 of the cable 102 defines a cable core 104. In the illustrated example of FIG. 3, the core 104 includes only the plurality of twisted pairs 108. In alternative implementations, the core 104 also may include a spacer that separates or divides the twisted pairs 108. For example, a star-type spacer can be used to divide the four twisted pairs 108. Other spacers, such as flexible tape strips or fillers defining pockets and having retaining elements that retain each of the twisted pairs within the pockets, also can be used. Additional spacer examples suitable for use with the cable 102 are described in U.S. Pat. Nos. 7,214,884; 7,115,815; and 7,271,342, the disclosures of which are hereby incorporated herein by reference.

Referring still to FIGS. 3 and 4, the cable 102 includes a jacket 106 that surrounds the core 104 of twisted pairs 108. In the illustrated embodiment, the jacket 106 is a double jacket having both a first inner jacket 107 and a second outer jacket 109. The inner jacket 107 surrounds the core 104 of twisted pairs 108. The outer jacket 109 surrounds the inner jacket 107. The inner and outer jackets 107, 109 function not only to maintain the relative positioning of the twisted pairs 108, but also to lessen the occurrence of alien crosstalk. In the illustrated example of FIG. 4, the outer jacket 109 has an outer diameter OD1 of between about 0.305 inches and 0.315 inches. The inner jacket 107 has an outer diameter OD2 of between about 0.236 and 0.250 inches.

The inner jacket 107 and the outer jacket 109 of the example cable 102 can be made from similar materials, or can be made of materials different from one another. Some example materials that can be used to manufacture the inner and outer jackets 107, 109 include plastic materials, such as polyvinyl chloride (PVC), polyethylene, fluoropolymers (e.g. ethylenechlorotrifluorothylene (ECTF) and Flurothylenepropylene (FEP)), or other electrically insulating materials. In other implementations, a low-smoke, zero-halogen material (e.g., polyolefin) can be used.

In one embodiment, each of the twisted pairs 108 of the cable 102 has a twist rate and associated lay length different from that of the other twisted pairs. This type of arrangement aids in reducing crosstalk between the pairs of the cable core 104. The cable core 104 of the cable 102 also has a cable twist rate and associated cable lay length. Various twisted pairs lay length arrangements and cable core lay lengths can be utilized in accordance with the present disclosure. Some example arrangements are described in U.S. Pat. No. 7,375,284, the disclosure of which is hereby incorporated herein by reference. Additional cable arrangements having other example pair and cable lay length arrangements that can be used are described in U.S. Pat. Nos. 7,214,884; 7,115,815; 7,271,342; 7,173,189; and 7,411,131; the disclosures of which are hereby incorporated herein by reference.

C. Connector with Retention Arrangement

Referring back to FIGS. 1 and 2, the first and second connectors 110 of the present patch cord 100 are each attached to the ends 101, 103 of the cable 102. In the illustrated example, the connectors 110 are plug-type connectors. In other implementations, however, the connectors 110 can include jack-type connectors. In one implementation, each of the components of the connector 110 is manufactured from polycarbonate. In other implementations, other materials also can be used in manufacturing the connector 110.

Each of the connectors 110 generally includes a plug nose 112 and an attachment member 114. The attachment member 114 secures to the cable 102 and organizes the twisted pairs 108 thereof. The plug nose 112 secures to the attachment member 114 and houses contacts that terminate the twisted pairs 108.

As shown in FIG. 1, each plug nose 112 includes main signal contacts 117 that terminate conductors 105 of the cable 100. Certain types of plug noses 112 also include memory storage contacts 111 that connect to a storage device 150 carried by the plug nose 112. For example, the storage contacts 111 and storage device 150 may be disposed in a key area of each plug nose 112 (see FIG. 19). Example implementations of a suitable plug nose 112 for use with connectors 110 are disclosed in U.S. patent application Ser. No. 12/907,724, filed Oct. 19, 2010, and titled "Managed Electrical Connectivity Systems," the disclosure of which is hereby incorporated herein by reference.

The attachment member 114 includes a body 115 having a retaining arrangement 149 retaining the connector 110 in an axially fixed position on the cable 102. FIGS. 5-14 illustrate one example implementation of a suitable attachment member 114 for use with a connector 110. The body 115 of the attachment member 114 includes a management section 120, a retention section 130, a boot 127, and a collar 140. In some implementations, the body 115 is molded as a monolithic piece. In other implementations, the sections may be separately molded and subsequently welded together, latched together, or otherwise secured together.

The management section 120 of the attachment member body 115 defines a plurality of channels 121 configured to receive components of the cable 102. For example, in some implementations, each channel 121 is configured to receive a twisted pair 108 of the cable 102. In other implementations, the management section 120 defines a sufficient number of channels 121 so that each channel 121 receives one wire 105 of a twisted pair 108. In some implementations, the channels 121 extend forwardly from the retention section 130. In other implementations, two arms 126 extend forwardly from the retention section 130 and the channels 121 are defined at a distal end of the arms 126 (see FIG. 7).

In some implementations, the channels 121 of the management section 120 extend parallel to each other. In other implementations, the channels 121 may branch out and extend at angles from each other. In some implementations, the channels 121 are coplanar. In other implementations, at least one channel 121 is formed beneath another channel 121. In the example shown, the management section 120 includes a top channel 122, a bottom channel 123, a left channel 124, and a right channel 125 (see FIG. 10). In other implementations, the management section 120 may have any suitable channel configuration.

The retention section 130 includes a base 131 and a moveable cover 133. In FIGS. 5-14, the cover 133 is shown in an open position, thereby providing access to the base 131. The cover 133 is configured to move to a closed position (see FIG. 18) covering the base 131. In the example shown, the cover 133 is attached to a base 131 via a flexible arm 134 that is configured to bend about a living hinge. The cover 133 and the base 131 hold a portion of the cable 102 therebetween when the cover 133 moves to the closed position. For example, in certain implementations, the cover 133 and the base 131 clamp around the inner jacket 107 of the cable 102.

In some implementations, the cover 133 is secured to the base 131 when moved to the closed position. In the example shown, the base 131 includes a latch member 137 and the cover 133 defines a latch recess 138 in which the latch member 137 is received to secure the cover 133 to secure the cover 133 to the base 131. In other implementations, the cover 133 may include the latch member and the base 131 may include the recess. In still other implementations, the cover 133 may be secured to the base 131 using fasteners, adhesive, welding, etc.

In some implementations, at least one of the base 131 and the cover 133 include grips that aid in retaining the portion of the cable 102 held between the cover 133 and the base 131. In certain implementations, both the base 131 and the cover 133 include grips. In the example shown, the base 131 includes three grips 135 and the cover 133 includes a single grip 136. In other implementations, however, the base 131 and cover 133 may include greater or fewer grips. In the example shown, the cover grip 136 is more pointed than the base grips 135. In other implementations, however, the grips 135, 136 may have any desired shape.

In some implementations, the cover 133 includes latching tabs 139 on an opposite side of the cover 133 from the grip 136. In the example shown, the cover 133 includes two spaced latching tabs 139. In other implementations, the cover 133 may include greater or fewer latching tabs 139. The latching tabs 139 are configured to be received in openings 113 (FIG. 18) defined in the plug nose 112 (see FIG. 2) to latch the plug nose 112 to the attachment member 114. In other implementations, however, the plug nose 112 may be otherwise secured to the attachment member 114.

In some implementations, an arm 132 extends from the body 115 forwardly of the retention section 130. For example, the arm 132 may extend from one side of the load boar section 130. In certain implementations, the arm 132 is curved in an arc extending first away from and then towards a longitudinal axis $A_L$ of the body 115. The arm 132 is sufficiently resilient to cooperate with a latching arm of the plug nose 112 to selectively release the connector 110 from an adapter port. Details pertaining to the interaction between the arm 132 and the plug nose latching arm can be found in U.S. patent application Ser. No. 12/907,724, incorporated by reference above.

The boot 127 extends rearwardly from the retention section 130 of the attachment member body 115. In some implementations, at least one side of the boot 127 tapers radially inwardly from the retention section 130 to the collar 140. In the example shown, two of the sides taper radially inwardly (see FIG. 7) and two of the sides extending generally parallel with the retention section 130 (see FIG. 9). In certain implementations, the boot 127 defines one or more cutouts 12 that facilitate limited lateral bending of the boot 127. Accordingly, the boot 127 provides some strain-relief for the cable 102.

A passage 128 extends through the boot 127 along the longitudinal axis $A_L$ of the body 115. The inner surface of the boot 127 has an inner diameter ID1 (FIG. 13) that is sufficiently large to receive the inner jacket 107 of the cable 102 (and components received therein). In certain implementations, the inner diameter ID1 of the passage 128 is not sufficiently large to accommodate the outer jacket 109 of the cable 102 (see FIG. 17).

The collar 140 extends from the boot 127 to an end of the connector 110. In the example shown, an exterior surface of the collar 140 is generally smooth. In other implementations, however, the exterior of the collar 140 may have ridges, bumps, or other surface textures. In some implementations, the collar 140 has a generally cylindrical shape. In other implementations, however, the collar 140 may have a rectangular cross-sectional shape, obround cross-sectional shape, oval cross-sectional shape, or any other suitable cross-sectional shape. A passage 141 extends through the collar 140 along the longitudinal axis $A_L$ of the attachment member body 115.

The collar 140 has a first section 147 adjacent the boot 127 and a second section 148 adjacent the end of the connector 110. The first section 147 has an internal diameter ID2 that is substantially the same as the internal diameter ID1 of the boot 127. The second section 148 has an internal diameter ID3 that is larger than the internal diameter ID2 of the first section 147. In certain implementations, the internal diameter ID3 of the second section 148 is sufficiently large to receive the cable 102 including both the inner jacket 107 and the outer jacket 109. The transition to between the first and second sections 147, 148 of the collar 140 defines a rearward facing ledge 146.

In some example implementations, the first section 147 has an internal diameter ID2 of between about 6 mm (about 0.24 inches) and about 7 mm (about 0.28 inches), and the second section 148 has an internal diameter ID3 of between about 7 mm (about 0.28 inches) and about 8 mm (about 0.31 inches). In certain implementations, the internal diameter ID2 is about 0.25 inches (6.35 mm) to about 0.27 inches (6.858 mm). In one example implementation, the internal diameter ID2 is about 6.5 mm (about 0.26 inches). In certain implementations, the internal diameter ID3 is about 7.6 mm (about 0.3 inches) to about 8.1 mm (about 0.32 inches). In one example implementation, the internal diameter ID3 is about 7.8 mm (about 0.31 inches)

In accordance with some aspects of the disclosure, the collar 140 includes a retention arrangement 149 to inhibit axial movement of the connector 110 on the cable 102. One or more teeth 143 protrude inwardly from the second section 148 of the collar 140. Each tooth 143 defines a ramp 144 camming inwardly as the tooth 143 extends away from the ledge 146 (e.g., see FIGS. 12 and 13). Each tooth 143 also defines a shoulder 145 that faces the ledge 146. In some implementations, the teeth 143 are generally rigid. In other implementations, the teeth 143 may be flexible. In the example shown, four teeth 143 are spaced 90° apart along an internal circumference of the collar 140 (e.g., see FIG. 14). In other implementations, greater or fewer teeth 143 may be located in a different configuration.

In some implementations, the second section 148 of the collar 140 defines at least one opening 142 in a circumferential wall of the collar 140 leading to the axial passage 141. For example, the second section 148 may define an opening 142 for each tooth 143. In some such implementations, each opening 142 extends from the ledge 146 to the respective tooth 143. In the example shown, the second section 148 of the collar 140 defines four openings 142 each positioned between one of the teeth 143 and the ledge 146. In other implementations, greater or fewer openings 142 may be defined in the collar 140. In certain implementations, the collar 140 may not define any openings through the circumferential wall.

FIGS. 15-19 show the attachment member 114 being positioned on one end of the cable 102. As will be described in greater detail hereinafter, assembly of the attachment member 114 on the cable 102 provides axial retention and strain relief for the connector 110. As shown in FIG. 15, to install the connector 110 on the first end 101 of the cable 102, the outer jacket 109 is removed from a section of cable beginning at the first end 101. The inner jacket 107 is removed from an end portion of this section to reveal the twisted pairs 108. The moveable cover 133 of the attachment member 114 is in the open position.

The cable 102 is inserted into the attachment member 114 through the passage 141 of the collar 140 and the passage 128 of the boot 127. The cable 102 continues to be inserted through the attachment member 114 until the inner jacket 107 extends across the base 131 of the retention section 130 and the twisted pairs 108 extends across the management section 120. The inner jacket 107 extends over the grips 135 of the base 131. In the example shown, the end of the inner jacket 107 abuts the guides defining the channels 121.

The twisted pairs 108 are arranged in the channels 121. In the example shown, each twisted pair 108 is positioned in a separate channel 121. In another implementation, each wire 105 of each twisted pair 108 may be positioned in a separate channel. In other implementations, one or more wires 105 of two or more twisted pairs 108 may be positioned in each channel 121. In certain implementations, the wires 105 of the twisted pairs 108 are trimmed to a desired length.

Figure 17:
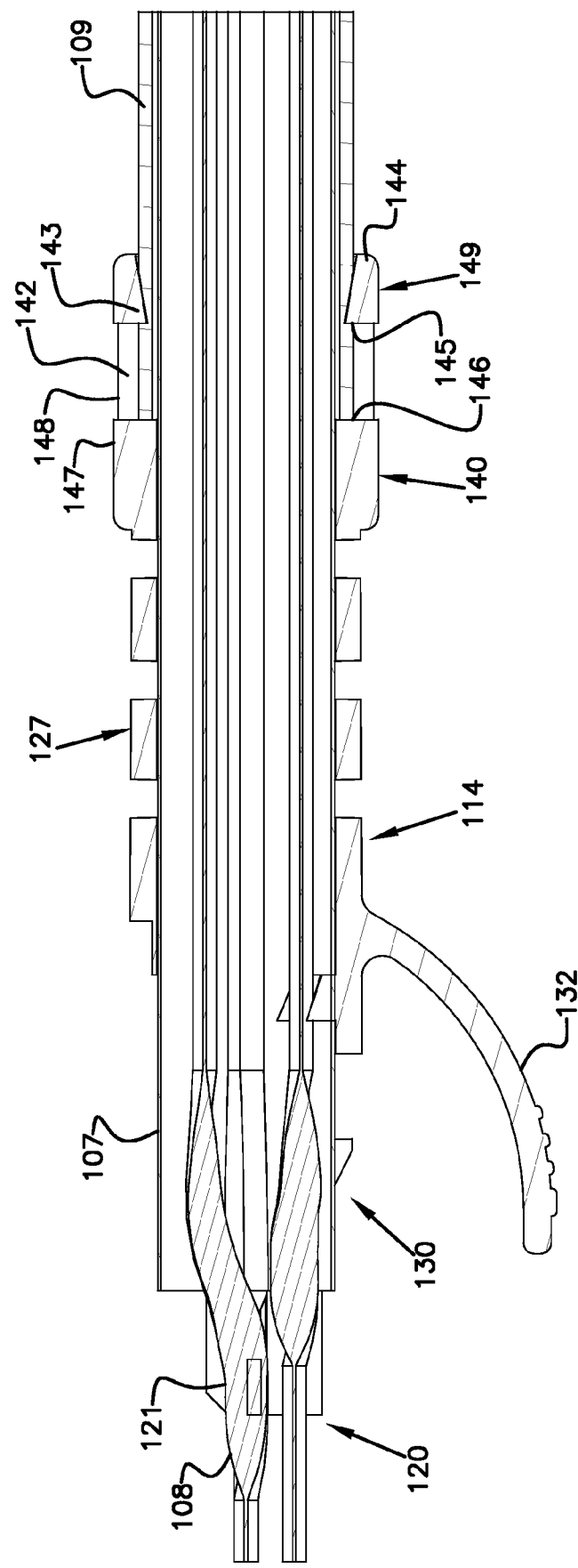
FIG. 17 is a cross-sectional view taken along the longitudinal axis of the partially assembled connector of FIG. 16.

As shown in FIG. 17, the inner diameter ID3 of the second section 148 of the collar 140 is sufficiently large to accommodate the outer jacket 109 of the cable 102. Accordingly, the outer jacket 109 of the cable 102 enters the passage 141 of the collar 140 when the cable 102 is inserted into the attachment member 114. The outer jacket 109 slides over the inwardly protruding teeth 143 as the outer jacket 109 slides forwardly through the collar 140. The inner diameter ID2 of the first section 147 of the collar 140 is not sufficiently to accommodate the outer jacket 109, however. Accordingly, the outer jacket 109 abuts against the ledge 146 of the collar 140.

The teeth 143 of the collar 140 protrude sufficiently far inwardly to bite into the outer jacket 109 of the cable 102 when an attempt is made to move the cable 102 rearwardly relative to the attachment member 114. In some implementations, the teeth 143 protrude sufficiently far inwardly to extend fully through the outer jacket 109. In other implementations, the teeth 143 protrude sufficiently inward to extend only partially through the outer jacket 109. In certain implementations, the teeth 143 extend partially through the inner jacket 107 as well as the outer jacket 109.

Figure 18:
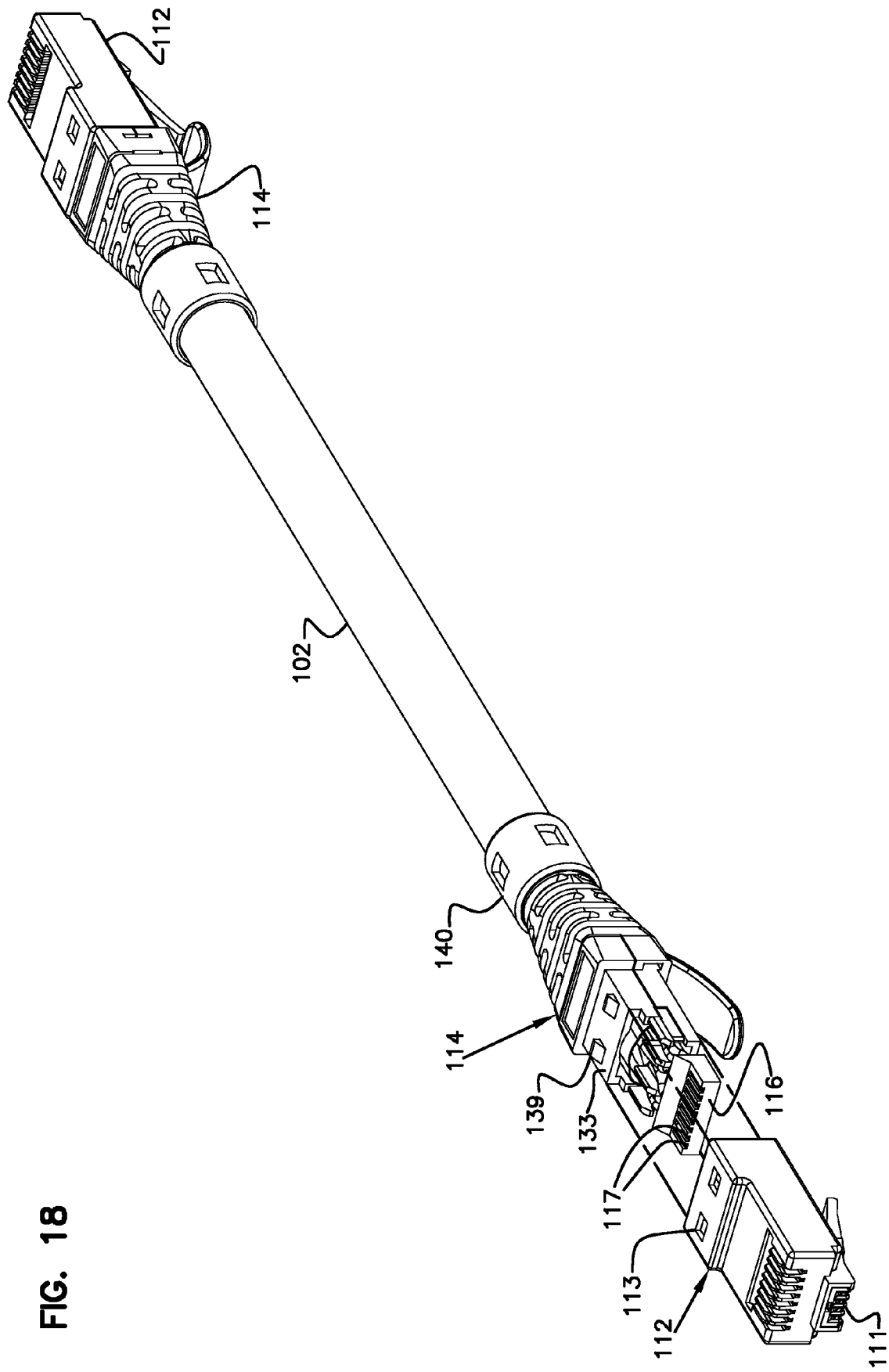
FIG. 18 is a perspective view of the patchcord of FIG. 2, with the plug nose of the first connector exploded from the attachment member.
Figure 19:
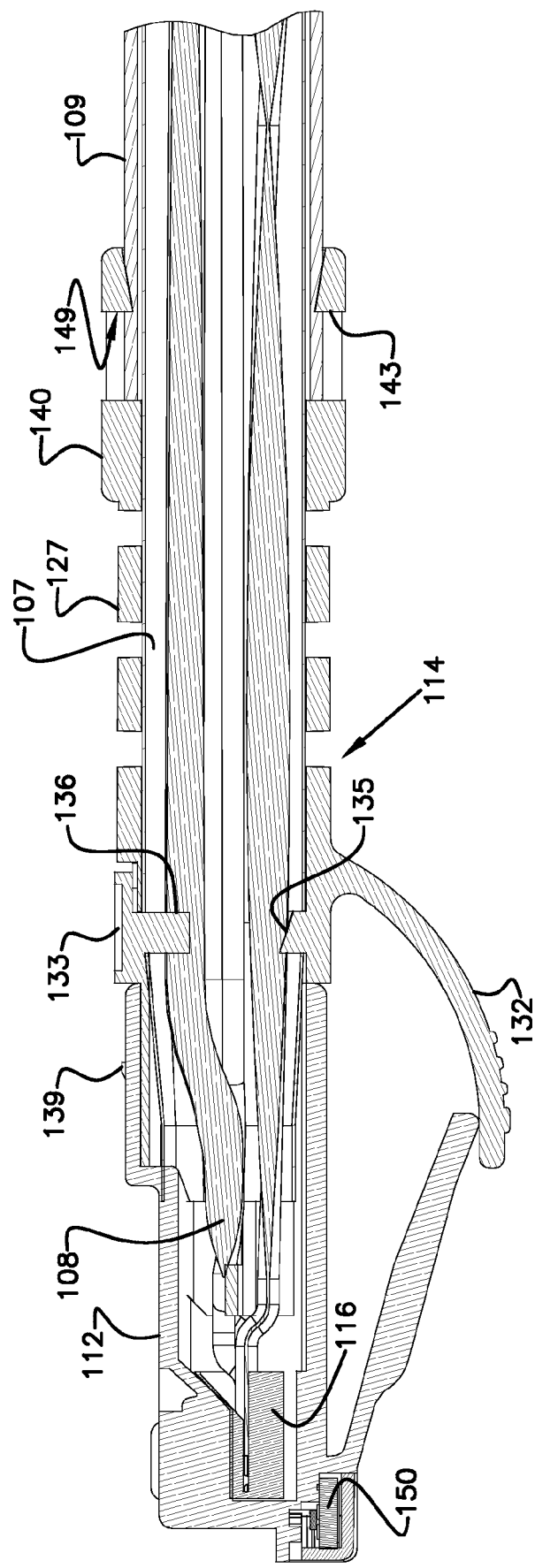
FIG. 19 is a cross-sectional view taken along the longitudinal axis of the exploded connector of FIG. 18.

As shown in FIGS. 18 and 19, the cover 133 is moved to the closed position relative to the retention section base 131 to enclose the inner jacket 107 therebetween. In some implementations, the cover 133 presses tightly enough against the inner jacket 107 and twisted pairs 108 to inhibit movement of the twisted pairs 108 from their respective channels 121. In other implementations, the cover 133 presses tightly enough against the inner jacket 107 to inhibit axial movement of the attachment member 114 relative to the inner jacket 107. In certain implementations, the cover 133 latches shut.

In certain implementations, the inner jacket 107 is caught between the grips 135, 136 when the cover 133 is shut. In some implementations, at least one of the grips 135, 136 bites into the inner jacket 107. In certain implementations, all of the grips 135, 136 bite into the inner jacket 107. In other implementations, the grips 135, 136 press against, but do not penetrate, the inner jacket 107.

After securing the attachment member 114 to the cable 102, the plug nose 112 is latched to the attachment member 114. In some implementations, the plug nose 112 defines latching openings 113 (FIG. 18) that receive latching members 139 protruding from a top of the cover 133 of the attachment member body 115 (see FIG. 2). In other implementations, however, the plug nose 112 can be otherwise secured to the attachment member 114. The plug nose 112 includes main signal contacts 117 that terminate the wires 105 of the twisted pairs 108. In certain implementations, the contacts 117 of the plug nose 112 are insulation-displacement contacts. In some implementations, the contacts 117 are held in a termination module 116 that is enclosed within the plug nose 112 and attachment member 114 (e.g., see FIG. 18). The plug nose 112 also defines one or more slots providing access to the contacts 117.

The above specification provides a complete description of the present invention. Since many embodiments of the invention can be made without departing from the spirit and scope of the invention, certain aspects of the invention reside in the claims hereinafter appended.

What is claimed is:

1. A patch cord comprising:
 a) a cable having a first end and a second end, the cable including:
  i) a plurality of twisted conductor pairs;
  ii) an inner jacket surrounding the plurality of twisted conductor pairs; and
  iii) an outer jacket surrounding the inner jacket; and
 b) a connector attached to one of the first and second ends of the cable, the connector including:
  i) a plug nose including contacts configured to terminate the twisted conductor pairs; and
  ii) a single-piece attachment member having a management section, a boot, and a collar, the management section defining channels configured to receive the twisted conductor pairs of the cable, the boot providing strain relief to the cable, and the collar including a retention arrangement including at least one rigid tooth that protrudes inwardly to bite into the outer jacket of the cable.

2. The patchcord of claim 1, wherein the attachment member of the connector also includes a retention section including a base and a moveable cover that is configured to clamp the inner jacket of the cable therebetween.

3. The patchcord of claim 1, wherein the collar includes four inwardly protruding teeth spaced at regular intervals around an interior surface of the collar.

4. The patchcord of claim 1, wherein the collar defines a ledge at a transition from a first section of the collar to a second section of the collar, the first section having a smaller internal diameter than the second section.

5. The patchcord of claim 4, wherein the internal diameter of the second section is sufficiently large to accommodate the outer jacket of the cable and the internal diameter of the first section is not sufficiently large to accommodate the outer jacket.

6. The patchcord of claim 4, wherein the outer jacket of the cable abuts against the ledge.

7. A method of assembling a patch cord, the method comprising:
   a) providing a cable including a plurality of twisted pairs and a double layer jacket surrounding the twisted pairs, wherein an outer layer of the double layer jacket has been removed from a section of the cable and an inner layer of the double layer jacket has been removed from a portion of the section of the cable;
   b) sliding an attachment member axially over the cable until the twisted pairs slide into a management section, the inner jacket slides into a retention section, and the outer jacket slides into a collar, over a plurality of rigid teeth, and against a ledge;
   c) closing a cover to clamp around the inner jacket of the cable; and
   d) sliding a plug nose over the cable towards the attachment member until the plug nose latches to the attachment member.

8. A connector comprising a single-piece attachment member defining a passage therethrough, the attachment member having a management section, a boot, and a collar, the management section defining a plurality of channels, the boot configured to provide cable strain relief, and the collar including a retention arrangement including opposing rigid teeth that protrude radially inwardly, each of the rigid teeth ramping away from the management section and defining a shoulder facing away from the management section.

9. The connector of claim 8, further comprising a plug nose that is coupled to the attachment member.

10. The connector of claim 9, wherein the plug nose extends over the management section of the attachment member.

11. The connector of claim 8, wherein the collar includes four inwardly protruding teeth spaced at regular intervals around an interior surface of the collar.

12. A connector comprising:

a plug nose including a plurality of electrical contacts; and an attachment member that is configured to couple to the plug nose, the attachment member extending along an axis from a first end to a second end, the attachment member defining a through-passage extending along the axis, the attachment member defining a plurality of channels at the first end and defining a ring at the second end, the attachment member also including a plurality of teeth extending inwardly from an inner surface of the ring, each of the teeth ramping inwardly as the tooth extends towards the first end of the attachment member so that each tooth defines an inwardly facing edge.

13. The connector of claim 12, wherein the plug nose latches to the attachment member.

14. The connector of claim 12, wherein the attachment member includes four teeth extending inwardly from an inner surface of the ring.

\* \* \* \* \*